March 26, 1968 R. G. PETTS ET AL 3,375,484
PHOTOFLASH ADAPTER
Filed Oct. 23, 1965

WILLIAM T. COLVILLE
RONALD G. PETTS
GEORGE W. PARSONS
INVENTORS

BY *Joseph C. Ryan*
ATTORNEY

United States Patent Office 3,375,484
Patented Mar. 26, 1968

3,375,484
PHOTOFLASH ADAPTER
Ronald G. Petts, Williamsport, and George W. Parsons, Hughesville, and William T. Colville, Williamsport, Pa., assignors to Sylvania Electric Products Inc., a corporation of Delaware
Filed Oct. 23, 1965, Ser. No. 503,402
2 Claims. (Cl. 339—147)

ABSTRACT OF THE DISCLOSURE

An adapter for a flashcube in which a flashcube socket is rotatably disposed within a socket retainer mounted on the top face of a base member and a face plate carrying electrical contacts is mounted on the socket retainer with the electrical contacts overlying the socket retainer and being disposed adjacent to the socket.

---

This invention relates to photographic equipment and more particularly to cameras provided with photoflash attachments.

In the photographic art, and in particular in amateur photography, most cameras are provided with some arrangement for receiving photoflash lamps so that the photographer can supplement the available natural and/or artificial light therewith whenever required. In some cameras this arrangement takes the form of a reflector-lamp socket-power source assembly built into the camera itself. In other cases the camera is provided with means for receiving a flashgun, an attachment which is readily attachable to and detachable from the camera, when, as and if required. The flashgun attachment usually comprises a reflector, a lamp socket and power supply.

Over the years, photoflash lamps have been packaged for ultimate use individually, i.e., each time a photographer wished to use a photoflash lamp, he removed one from a package of several and inserted it into the socket provided therefor either in the camera itself or in the flashgun attachment. After the picture had been taken the photographer had to remove the hot, used flashlamp and dispose of it before he could proceed to take another picture. This was both awkward and time-consuming, particularly in more recent years as the flashlamps become smaller and smaller and thus more difficult to handle.

Recently, new flashlamp packaging concepts have been developed whereby several flashlamps are packaged in a unitary structure which includes a separate reflector for each lamp and means for establishing the electrical connections from the lamp to a socket provided therefor in a camera without the necessity for removing the lamps individually from their package each time one is to be used. This unitary structure comprising several packaged flashlamps each with its own reflector, hereinafter referred to as a flashcube, makes it unnecessary to provide cameras with built-in reflectors or means for receiving flashguns.

Many new cameras are now being designed to receive the flashcube. However, some means should be provided to enable photographers having older photographic equipment to adapt their cameras to receive and use the flashcube in order that they might enjoy the many advantages provided by it. This is particularly true in the case of some of the more expensive cameras which are provided with means for receiving a flashgun attachment. This, therefore, is the principal object of this invention.

In accordance with the principles of our invention, an adapter is provided which will enable a photographer to use flashcubes with his camera instead of a flashgun without the necessity of modifying his camera in any way. In a specific embodiment of the invention, an adapter is provided which comprises a base having a power supply disposed therein and a socket for receiving a flashcube rotatably supported thereon. Suitable wiring is provided to electrically connect the power supply in the base of the adapter with electrical contacts associated with the socket for receiving the flashcube. The adapter is also provided with a cable for detachably connecting it to the camera with which it is to be used.

In the specific embodiment of the invention illustrated in the accompanying drawing, FIGURE 1 is a perspective view of an adapter mounted on a camera, with a flashcube mounted on the adapter, both the camera and the flashcube being shown in phantom.

Figures 1, 2, 3:
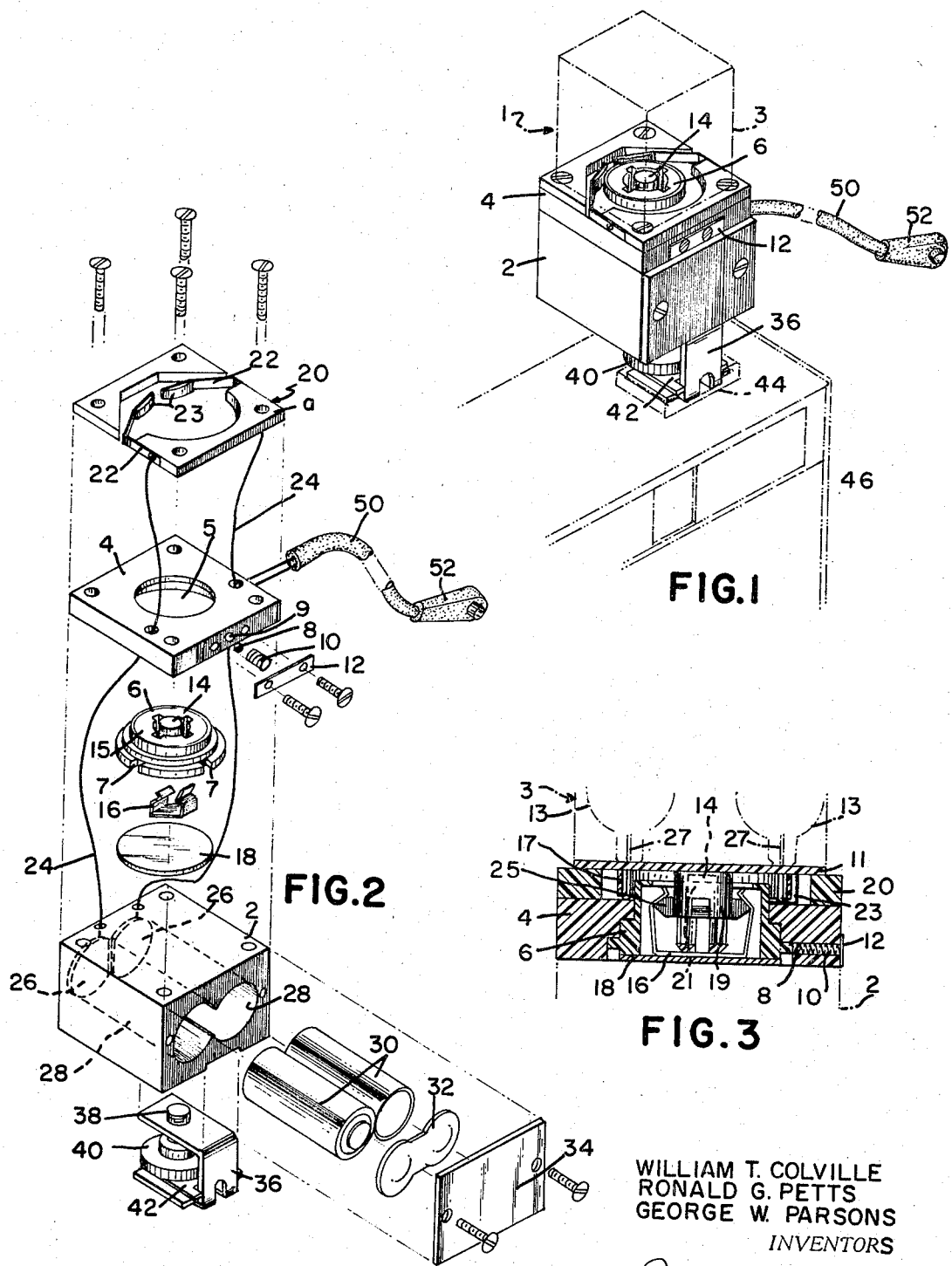
FIGURE 2 is an exploded view of the adapter.
FIGURE 3 is an enlarged cross sectional detail of the base-socket relationship.

As shown particularly in FIG. 2, the adapter comprises a block-like base 2 with a socket retainer 4 mounted on the top face thereof. A disk-like socket 6 is rotatably disposed within the central circular opening 5 formed in the retainer 4. Detent means are provided to lock the rotatable socket 6 at four different positions, each 90° apart. The detent means comprises notches 7 formed in the peripheral edge of the socket 6 and a ball 8 disposed in a bore 9 provided therefor in a side wall of the socket retainer 4. The ball 8 is retained within the bore 9 and in firm frictional engagement with the peripheral edge of the socket 6 and the notches 7 formed therein by spring 10 which is in turn retained within the bore 9 by retainer plate 12. The disk-like socket 6 is provided with a centrally located pin 14 about which are cut four radially extending slots 15, 90° apart. A substantially U-shaped locking clip 16 is frictionally secured to the bottom face of the socket 6, the legs of the clip entering into apertures provided therefor and being disposed in alignment with a pair of slots 15, 180° apart. A metal bearing disk or plate 18 is disposed between the bottom of the socket 6 and the top face of the base 2. The function and purpose of these several elements will be described in detail below in connection with the description of their cooperative relationship with respect to a flashcube.

A segmented face plate 20 is mounted on top of the socket retainer 4. Segment a of the face plate 20 has a pair of flexible strip metal electrical contacts 22 attached thereto and overlying the socket retainer 4, the free ends of these electrical contacts 22 being built up to provide bearing surfaces 23. Wires 24, connected to the fixed ends of the electrical contacts 22, extend through holes provided therefor in the socket retainer 4 and base 2, and are attached to metal discs 26 seated at the bottom of bores 28 formed in the base 2. The power supply comprises a pair of batteries 30 fitted in the bores 28. Contact plate 32 bridges the two batteries 30. The battery chamber is provided with a cover plate 34 attached to base 2.

The bottom face of the base 2 has a substantially U-shaped bracket 36 attached thereto by a screw 38 which extends through the legs thereof. A knurled nut 40 and a spring-loaded plate 42 provide the means for securely fastening the adapter onto a camera. Thus, as shown in FIG. 1 for example, the bracket 36 is slipped onto a shoe 44 on the top face of a camera 46 with a portion of the shoe lying between the plate 42 and the adjacent leg of the bracket 36. The nut 40 is then tightened to thereby securely fasten the adapter to the camera.

A cable 50 is provided to electrically connect the flashcube to the camera, one end of the cable being fixedly attached to one of the wires 24 extending through the socket retainer 4, and the other end being provided with a plug 52 for detachably connecting it to a suitable jack with which the camera is provided.

A flashcube of the type for which this adapter has been specifically designed is illustrated and described in the co-pending application of Franklin D. Kottler et al., Ser. No. 417,914, filed Dec. 14, 1964, and now U.S. Patent No. 3,327,105 and entitled "Disposable Multilamp Photoflash Unit." In the specific example illustrated in that application, the flashcube comprises four flashlamps each with its own reflector disposed in a transparent container having a base of plastic material. The base is a substantially square member having a contact ring formed integral therewith and depending from the lower face thereof. The base is provided with paired holes therein, one series of holes being outside the contact ring and the other series inside. The two lead-in wires extending from each flashlamp are threaded through the holes provided therefor on the inside of the contact ring, drawn tightly across the ring and anchored in the holes provided therefor on the outside of the ring.

Centrally disposed within the area defined by the contact ring and coaxial therewith is a depending cylindrical center post or spindle which is also formed integrally with the base. This center post or spindle provides the means for retaining the flashcube on a receiving socket. It is provided with a central bore to receive the socket spindle and four lugs equally spaced about the periphery thereof and extending radially therefrom.

The function of several of the adapter components and their cooperative relationship with respect to a flashcube will now be described, reference being made primarily to FIG. 3. The flashcube 1 comprises a transparent container 3 having a plastic base 11 on which a plurality of flashlamps 13 are supported. Lead-in wires 27 extending from the lamps 13 extend through apertures provided therefor in the base 11 and are drawn tightly across a contact ring 17 depending from the lower face of the base 11 and formed integral therewith. A central spindle or post 19 having a bore 21 also depends from the lower face of the base 11 and is formed integral therewith. The post 19 has four lugs 25 equally spaced about the periphery thereof and extending radially therefrom.

A flashcube 1 is positioned on the adapter by seating it on the face plate 20 thereof so that the depending central post 19 of the base 11 of the flashcube is aligned with the central pin 14 of the socket 6 of the adapter and the pin 14 lies within the bore 21 of the post 19. In order to effect this insertion, the lugs 25 extending radially from the center post 19 of the flashcube must be oriented in register with the slots 15 so that they will enter therein as the flashcube is seated on the face plate 20 of the adapter. When so positioned, the related components of the flashcube and the adapter will be located as shown in FIG. 3. The legs of the U-shaped locking clip 16 of the adapter overlie a pair of lugs 25 of the flashcube and are in interlocking engagement therewith to thus securely attach the flashcube to the adapter. The ball 8 in bore 9 in the side wall of the socket retainer 4 is seated in one of the notches 7 in socket 6 and thus locks the flashcube in a predetermined position of orientation in which one of the flashlamps 13 is in firing position with its lead-in wires 27 in positive frictional engagement with the built-up bearing surfaces 23 on the ends of the flexible strip metal electrical contacts 22 attached to the face plate 20.

After a flashlamp 13 has been fired, the flashcube 1 is rotated manually 90 degrees to bring another flashlamp into firing positioin. The socket 6 of the adapter rotates with the flashcube because the two are locked to one another by the clip 16—lugs 25 arrangement described above. With the application of a positive rotational force on the flashcube, the flashlamp orienting detent mechanism becomes disengaged and then re-engages 90 degrees later as the next notch 7 in the socket 6 is brought into register with the spring-loaded ball 8 in the socket retainer 4. After the four flashlamps have been fired, the used flashcube is removed from the adapter by applying linear forces thereon in opposite directions sufficient to flex the legs of the U-shaped locking clip 16 of the adapter enough to disengage it from interlocking engagement with the lugs 25 on the depending post 21 of the flashcube. The adapter is then ready to receive a new flashcube.

What we claim is:

1. An adapter for a flashcube comprising: a base member; a power supply disposed in said base member; a socket retainer mounted on the top face of said base member; a flashcube socket rotatably disposed in said socket retainer; a face plate mounted on the top face of said socket retainer; a pair of electrical contacts attached to said face plate, overlying said socket retainer and disposed adjacent to said socket; and means for electrically connecting said electrical contacts to said power supply.

2. An adapter for a flashcube comprising: a base member; a power supply disposed in said base member; a socket retainer mounted on said base member; a substantially round flashcube socket rotatably disposed in said socket retainer; detent means, located in said socket retainer, for defining several predetermined loci about the peripheral edge of said socket; means in said socket for preventing relative rotation of a flashcube with respect to its socket; a face plate mounted on the top face of said socket retainer; a pair of electrical contacts attached to said face plate, overlying said socket retainer and disposed adjacent to the periphery of said socket; and means for electrically connecting said electrical contacts to said power supply.

References Cited
UNITED STATES PATENTS

| | | | |
|---|---|---|---|
| 3,075,070 | 1/1963 | Lipsitz | 240—1.3 |
| 3,096,025 | 7/1963 | Prochnow | 240—1.3 |
| 3,312,086 | 4/1967 | Casebeer et al. | 240—1.3 |
| 3,319,548 | 5/1967 | Kottler | 240—1.3 |

RICHARD E. MOORE, *Primary Examiner.*